US008015925B2

(12) United States Patent  
Simon

(10) Patent No.: US 8,015,925 B2  
(45) Date of Patent: Sep. 13, 2011

(54) AIR BUS TRANSPORTATION SYSTEM

(76) Inventor: Abner J. Simon, Richmond, VA (US)

( * ) Notice: Subject to any disclaimer, the term of this patent is extended or adjusted under 35 U.S.C. 154(b) by 0 days.

(21) Appl. No.: 12/801,660

(22) Filed: Jun. 18, 2010

(65) Prior Publication Data

US 2010/0326311 A1 Dec. 30, 2010

Related U.S. Application Data

(60) Provisional application No. 61/213,540, filed on Jun. 18, 2009.

(51) Int. Cl.
A63G 1/00 (2006.01)

(52) U.S. Cl. ........ 104/23.1; 104/124; 104/125; 105/1.1; 105/1.2

(58) Field of Classification Search .................. 104/23.1, 104/124, 125, 139; 105/1.1, 1.2, 1.3, 66
See application file for complete search history.

(56) References Cited

U.S. PATENT DOCUMENTS

| 1,733,270 | A | * | 10/1929 | Messer | 191/12 R |
|---|---|---|---|---|---|
| 1,798,852 | A | * | 3/1931 | Roghmanns | 104/23.1 |
| 1,813,245 | A | * | 7/1931 | Mansfeld | 104/23.1 |
| 2,788,749 | A | * | 4/1957 | Hinsken et al. | 104/118 |
| 2,976,820 | A | * | 3/1961 | Schaar | 105/141 |
| 3,477,389 | A | * | 11/1969 | Trent | 104/118 |
| 3,543,685 | A | * | 12/1970 | Rosciszewski | 104/23.2 |
| 3,675,582 | A | * | 7/1972 | Girard et al. | 104/23.1 |
| 3,919,944 | A | * | 11/1975 | Jorg | 104/23.1 |
| 4,036,147 | A | * | 7/1977 | Westling | 104/23.1 |
| 4,703,697 | A | * | 11/1987 | Bell | 104/23.1 |
| 4,841,871 | A | * | 6/1989 | Leibowitz | 104/23.1 |
| 4,899,665 | A | * | 2/1990 | La Sorte | 104/23.1 |
| 4,941,406 | A | * | 7/1990 | Lay | 104/23.1 |
| 5,222,689 | A | * | 6/1993 | Simuni | 244/1 R |
| 5,535,963 | A | * | 7/1996 | Lehl et al. | 244/3 |
| 5,653,174 | A | * | 8/1997 | Halus | 104/124 |
| 6,178,892 | B1 | * | 1/2001 | Harding | 104/155 |
| 6,644,209 | B2 | * | 11/2003 | Cummins | 104/156 |
| 6,763,766 | B1 | * | 7/2004 | Cornellier | 104/20 |
| 7,398,946 | B1 | * | 7/2008 | Marshall | 244/58 |
| 2006/0219124 | A1 | * | 10/2006 | Jordan | 104/23.1 |
| 2010/0326311 | A1 | * | 12/2010 | Simon | 104/23.1 |

* cited by examiner

Primary Examiner — Joe Morano, IV  
Assistant Examiner — Jason C Smith  
(74) Attorney, Agent, or Firm — Stites & Harbison PLLC; Juan Carlos A. Marquez, Esq.

(57) ABSTRACT

A transportation system includes a vehicle having wings, a propulsion system, a lifting gear coupling the vehicle to an undercarriage, and a guidance assembly movably connecting the undercarriage to guide rails. The wings generate aerodynamic lift when the vehicle exceeds a first speed. The lifting gear supports a load of the vehicle in a first position in relation to the undercarriage when the vehicle travels at less than the first speed, allows the vehicle to lift to a second position in relation to the undercarriage as the vehicle accelerates beyond the first speed, and maintains the vehicle in the second position when the vehicle exceeds the first speed. The guidance assembly shiftingly engages the guide rails through rollers that are in rolling contact with the guide rails when the vehicle is in the first position and are displaced from the guide rails when the vehicle is in the second position.

16 Claims, 9 Drawing Sheets

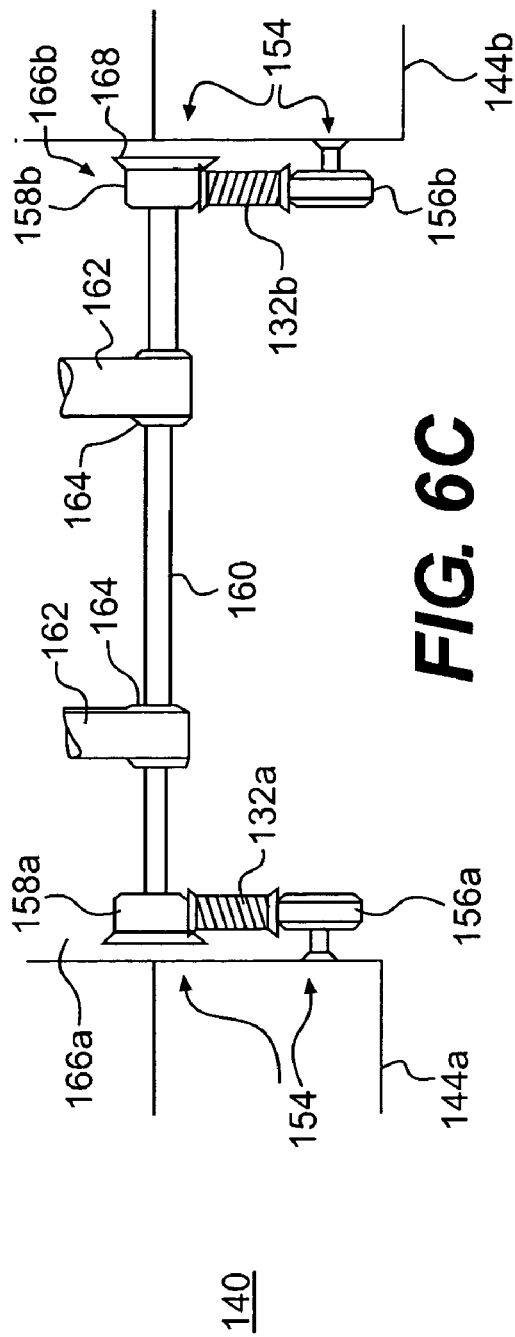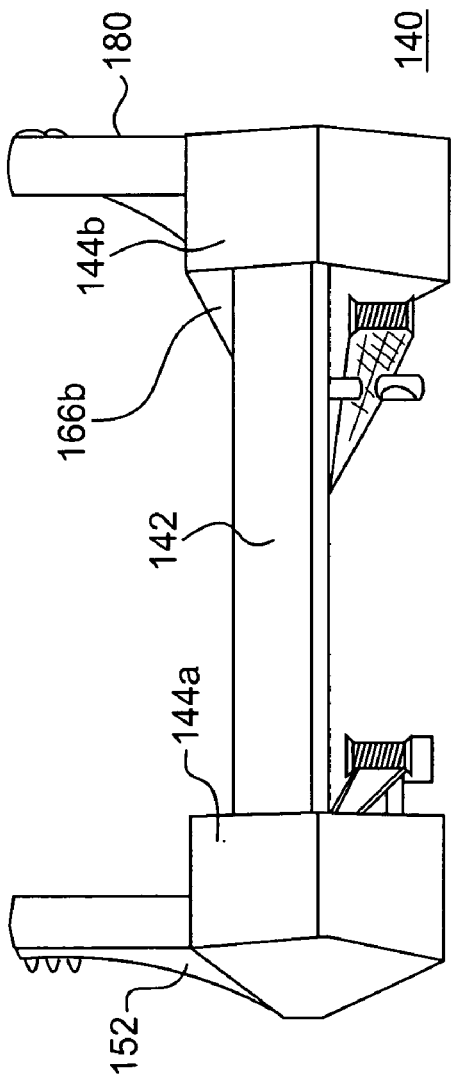

AIR BUS TRANSPORTATION SYSTEM

CLAIM OF PRIORITY

This application claims the benefit of U.S. Provisional Application No. 61/213,540, filed on Jun. 18, 2009. The disclosure of the above-referenced application is incorporated herein by reference.

FIELD OF THE INVENTION

Exemplary embodiments of the present invention relate to transportation systems, and, more particularly, to transportation systems providing vehicles that attain aerodynamically airborne flight and achieve high-speeds while being guided along a path of travel provided by a guide rail structure.

BACKGROUND OF THE INVENTION

The statements in this section merely provide background information related to the present disclosure and may not constitute prior art.

Transportation of people and cargo has become increasingly important in our modern lives. In the United States, the typical modes of travel between cities include air, bus, personal automobile, and, to a somewhat more limited extent, conventional rail. Following World War II, the U.S., in contrast to Europe and Japan, which invested more heavily in rebuilding railways and other forms of mass transportation after the war, emphasis was directed to building airports and a national interstate highway system.

More recently, however, as energy costs continue to increase, the use of rail transportation has been increasing throughout the U.S. Nevertheless, the conventional forms of mass transportation are generally reliant on oil-based fuels. For example, buses are primarily powered by internal combustion engines that use gasoline or diesel, and conventional trains that cover long distances also operate through consumption of petroleum-based fuels. Moreover, these conventional forms of mass transportation are inherently limited in speed by their designs and fundamental methods operation.

As a result, attention is now being directed to energy-efficient forms of high-speed rail transportation, which is a term used to describe passenger rail transport that operates significantly faster than the normal speed of rail traffic (for example, 140 mph or higher), as an alternative to conventional modes of transportation.

SUMMARY OF THE INVENTION

The shortcomings of the prior art can be overcome and additional advantages can be provided through exemplary embodiments of the present invention that are related to a transportation system that includes a vehicle body having a set of wings extending outward therefrom, a propulsion system, an elongated guide rail structure forming a path of travel, an undercarriage disposed beneath the vehicle body, a lifting gear mechanism coupling the vehicle body to the undercarriage, and a guidance assembly movably connecting the undercarriage to the guide rail structure. The set of wings are adapted to generate aerodynamic lift on the vehicle body when a traveling speed of the vehicle body exceeds a first speed. The propulsion system is configured to propel to vehicle body to accelerate the traveling speed of the vehicle body from less than the first speed to a second speed that exceeds the first speed. The lifting gear mechanism is configured to support a load of the vehicle body in a first position in relation to the undercarriage when the traveling speed of the vehicle body is less than the first speed, to allow the vehicle body to lift from the first position to a second position in relation to the undercarriage as the traveling speed of the vehicle body accelerates from less than the first speed to the second speed, and to maintain the vehicle body in the second position when the traveling speed of the vehicle body is greater than or equal to the second speed. The guidance assembly comprises a set of rollers and a set of guiding supports configured to shiftingly engage the guide rail structure such that the set of rollers are in rolling contact with the guide rail structure to guide movement of the undercarriage along the path of travel when the vehicle body is traveling in the first position in relation to the undercarriage, the set or rollers are displaced from the guide rail structure when the vehicle body is traveling in the second position in relation to the undercarriage, and the guiding supports guide movement of the undercarriage along the path of travel when the vehicle body is traveling in the second position in relation to the undercarriage.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

FIGS. 6A-6D are various views illustrating an exemplary undercarriage structure and an exemplary guidance assembly;

Figure 1:
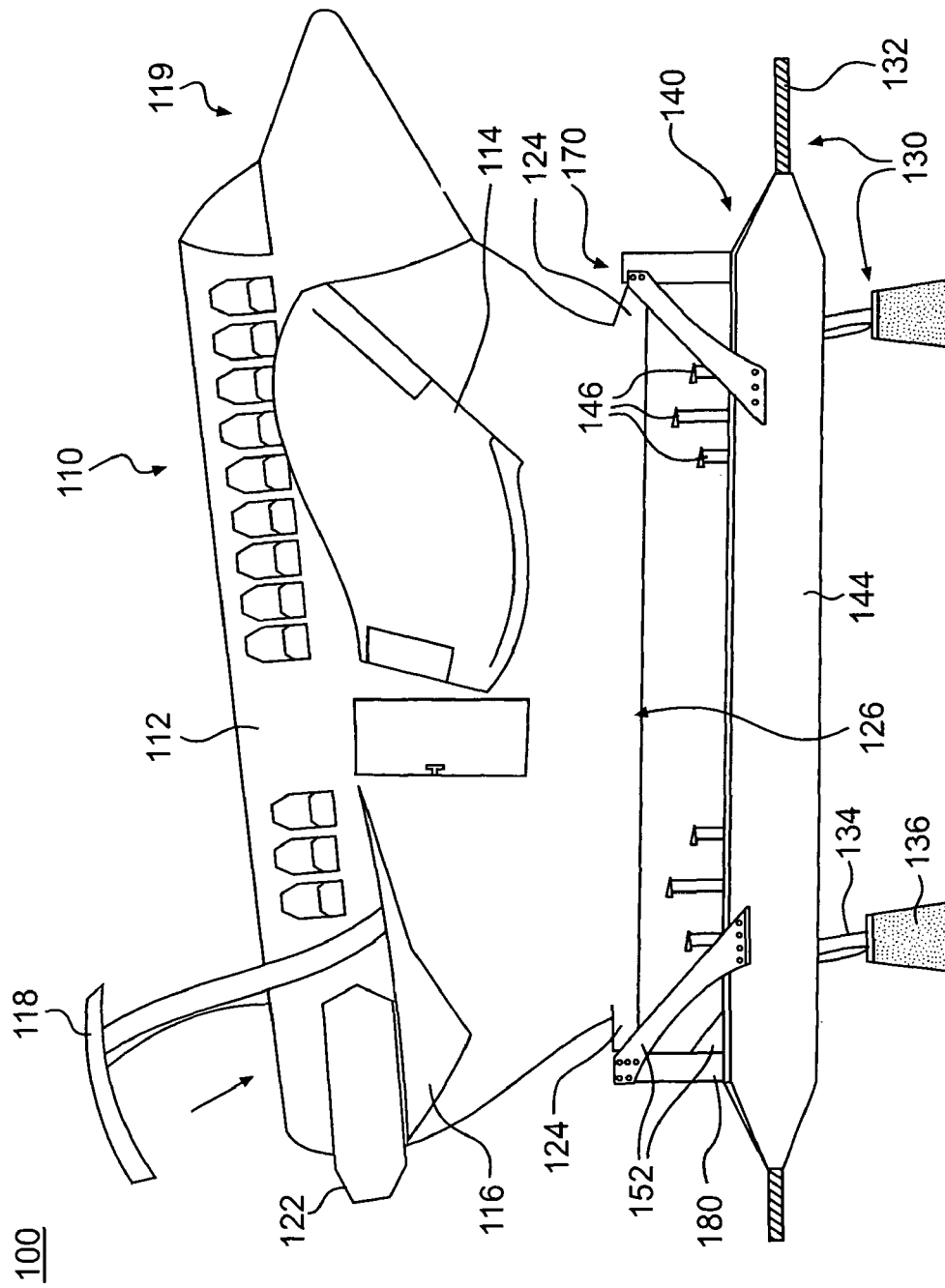
FIG. 1 is a side view of a transportation system in accordance with an exemplary embodiment of the present invention.

The detailed description explains exemplary embodiments of the present invention, together with advantages and features, by way of example with reference to the drawings. Any flow diagrams depicted herein are just examples. There may be many variations to these diagrams or steps (or operations) described therein without departing from the spirit of the invention. For instance, steps may be performed in a differing order, or steps may be added, deleted, or modified. All of these variations are considered a part of the claimed invention.

DETAILED DESCRIPTION OF THE PREFERRED EMBODIMENTS

While the specification concludes with claims defining the features of the invention that are regarded as novel, it is believed that the invention will be better understood from a consideration of the description of exemplary embodiments in conjunction with the drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form. For purposes of clarity, the same reference numbers will be used in the drawings to identify similar elements. Further, the terms and phrases used herein are not intended to be limiting but rather to provide an understandable description of the invention.

Exemplary embodiments of the present invention may be implemented to provide a high-speed rail transport system that can be utilized for transportation of people and/or cargo, may be powered by a propulsion system that does not comprise an internal combustion engine, and includes aerodynamic features to achieve speeds that are typically attributed to modern commercial aircraft such as, for example, up to and greater than 150 miles per hour. More particular, exemplary embodiments can be implemented to provide a high-speed rail transport system that incorporates a winged vehicle having an aerodynamic body structure, which may resemble, for example, an airplane, that is movably coupled to a dual rail track. During operation, the vehicle rolls along the dual rail track at low speeds and, as the vehicle accelerates along the dual rail track, the winged, aerodynamic body shape of the vehicle allows the vehicle to lift sufficiently up off the track and attain aerodynamically airborne flight guided along the rail. Thus, exemplary embodiments can be implemented to provide a vehicle that is guided by a dual rail track and configured to ride along an air cushion such that frictional resistance to forward motion of the vehicle along the track that results from interaction with the track is reduced to a negligible amount, thereby allowing the vehicle to achieve and travel at high speeds.

Figure 2:
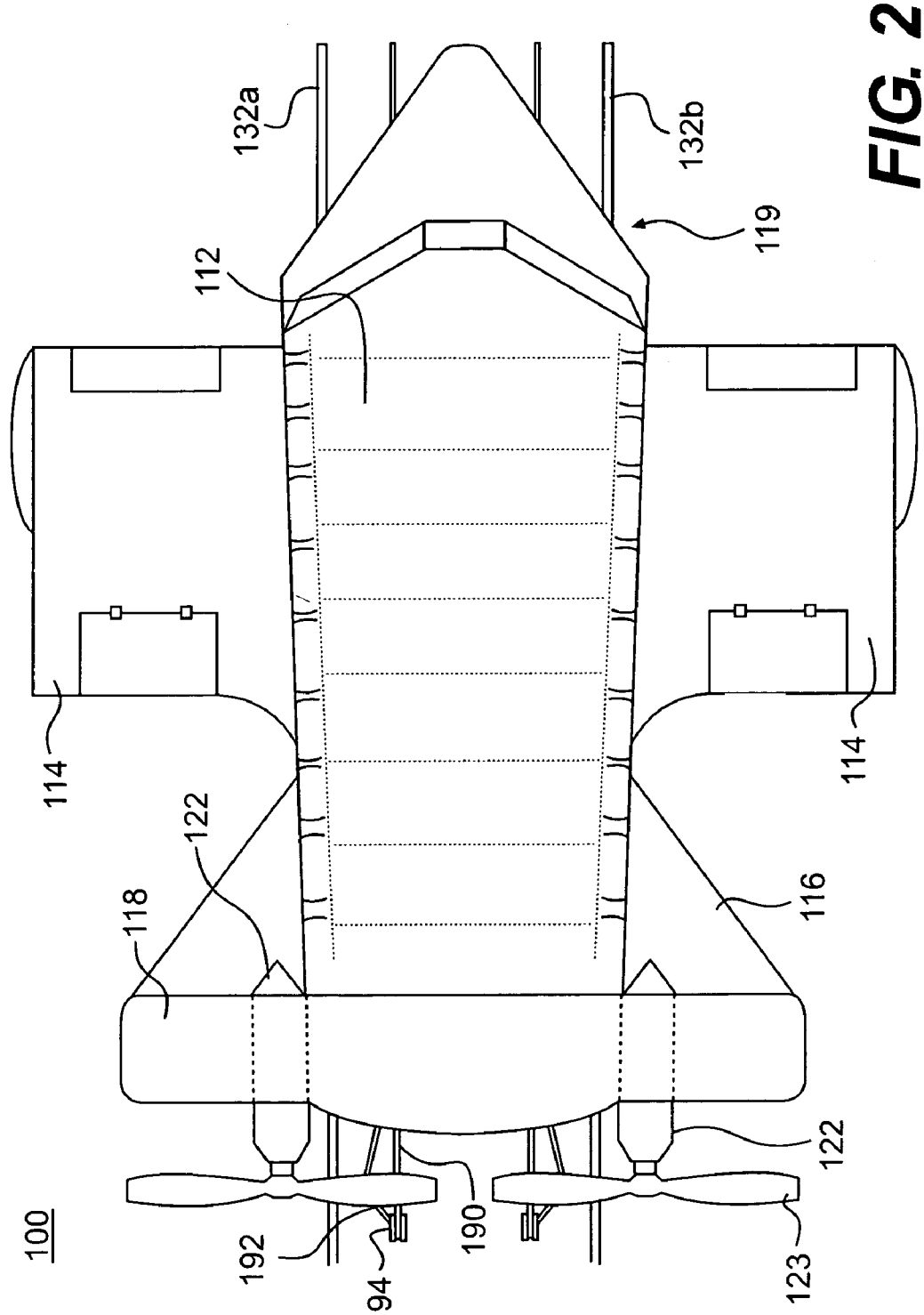
FIG. 2 is a top view of the exemplary transportation system of FIG. 1.
Figure 3:
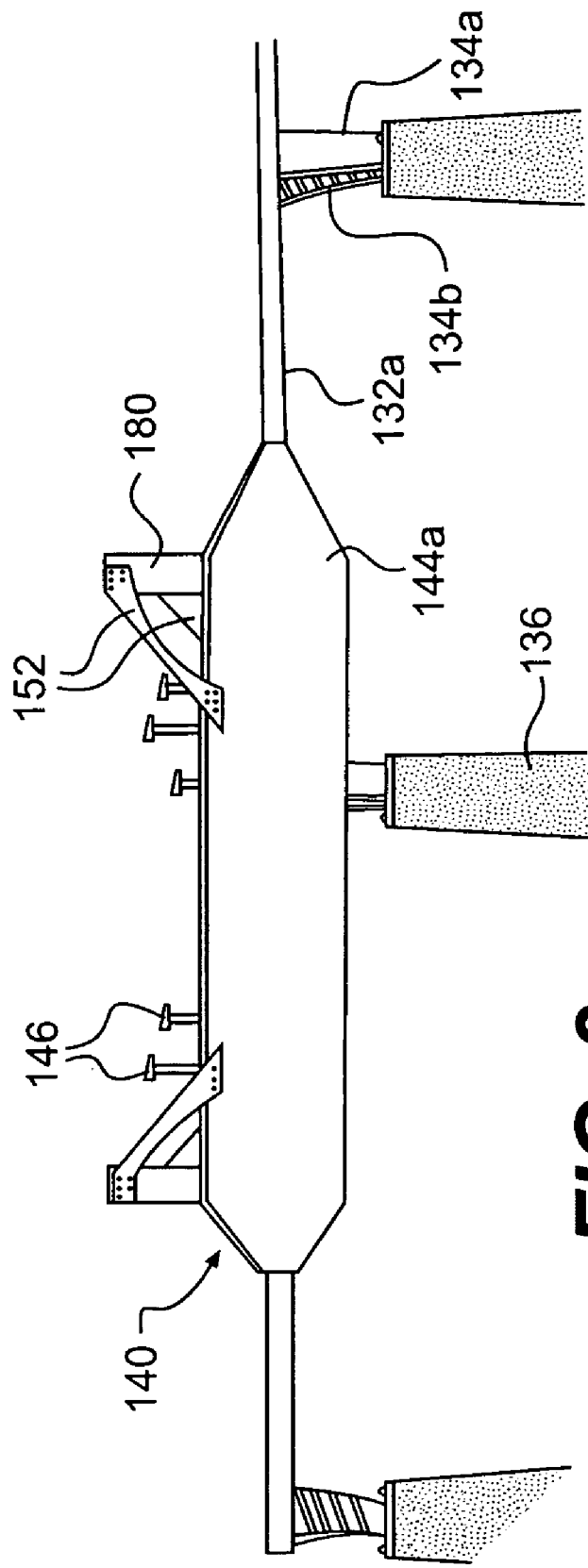
FIG. 3 is a side view illustrating a guide rail structure and an undercarriage structure of the exemplary transportation system of FIGS. 1 and 2.

Referring now to FIGS. 1-3, an exemplary embodiment of a high-speed rail transport system 100 in accordance with the present invention is illustrated. Exemplary transport system 100 generally includes a winged aircraft-like vehicle 110 that is disposed above and configured to travel along a guide rail structure or track 130 via an undercarriage structure 140. As will be explained in greater detail below, vehicle 110 is coupled to undercarriage structure 140 via a lifting gear mechanism 170, and the undercarriage structure is further movably connected to guide rail structure 130 to thereby facilitate guided movement of the vehicle along the guide rail structure.

In exemplary embodiments, an elongated or tubular main body 112 of vehicle 110 can be constructed from, for example, light weight metal or fiberglass material. Body 112 can provide an internal cabin area (not shown) for passengers and/or cargo. The cabin area can comprise, for example, seating arrangements for passengers constructed using lightweight woods, plastics, fabrics, and cushioning materials. Body 112 can be provided with a suitable number of appropriately located windows and doors, as well as an internal cockpit area at a tapered front end 119 for accommodating one or more operators. The cockpit area may also be provided with a suitable front window that allows for an unobstructed view therefrom. In various embodiments, the shape of body 112 can be of a design to accommodate a variety of capacity ranges and transport applications.

Figure 4:
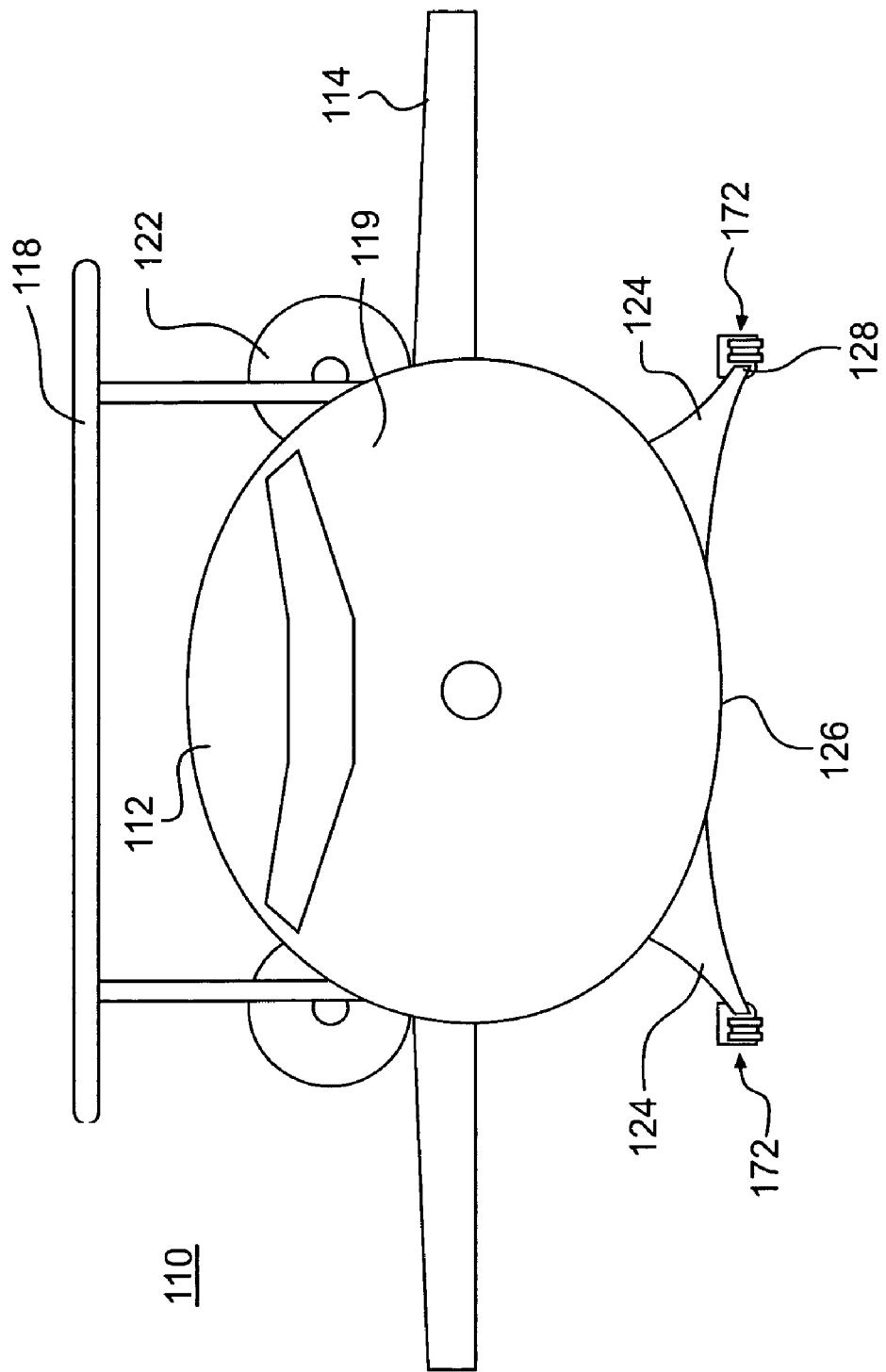
FIG. 4 is a front view illustrating a vehicle of the exemplary transportation system of FIGS. 1 and 2.

With further reference to FIG. 4, vehicle 110 of exemplary transport system 100 includes a pair of side wings 114 laterally projecting from opposing sides of body 112 proximate to front end 119, a pair of tail wings 116 laterally projecting from opposing sides of body 112 proximate to a rear end 120 of the body, and a stabilizer 118 projecting vertically from rear end 120 of the body. In exemplary embodiments, side wings 114 can be shorter than those of conventional aircraft. For example, side wings may be 6 to 10 feet in length. Vehicle 110 further includes a pair of engines 122 disposed at opposing sides of body 112 at rear end 120, and a set of legs 124 extending from a base 126 of the body. In exemplary embodiments, engines 122 can each further comprise a set of propellers 123. As can be seen by viewing FIG. 1 in conjunction with FIG. 4, legs 124 of vehicle body 110 comprise a pair of opposing front legs and a pair of opposing rear legs, and each leg has a respective lifting gear roller 172 extending from an end 128 thereof. The operation of lifting gear rollers 172 will be explained in greater detail below.

Figure 5B:
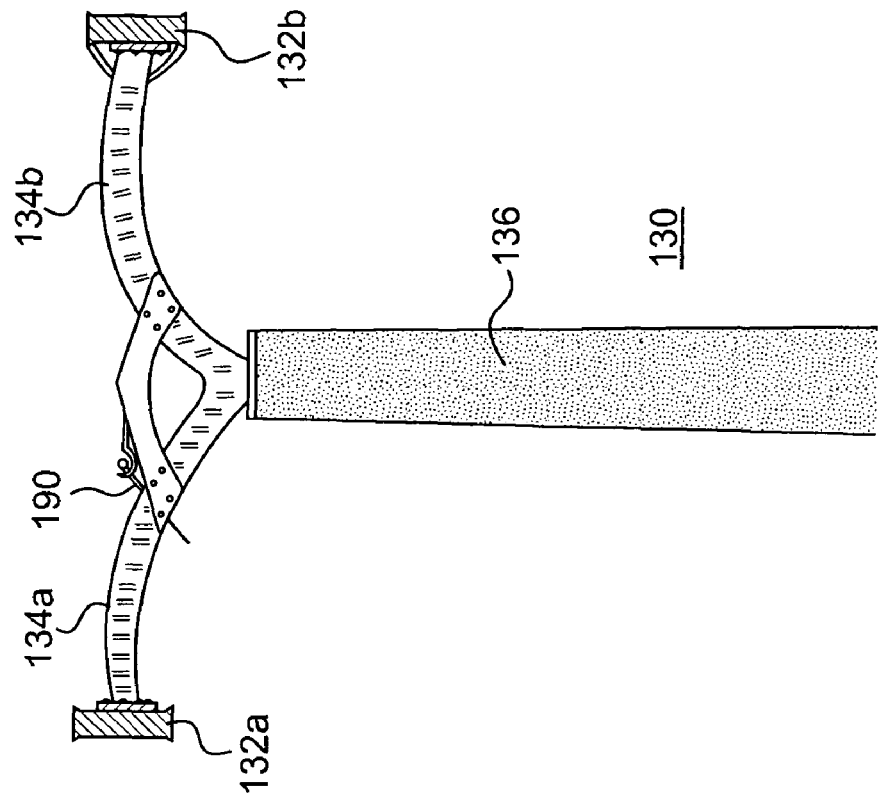
FIGS. 5A and 5B illustrate an exemplary guide rail structure.
Figure 5A:
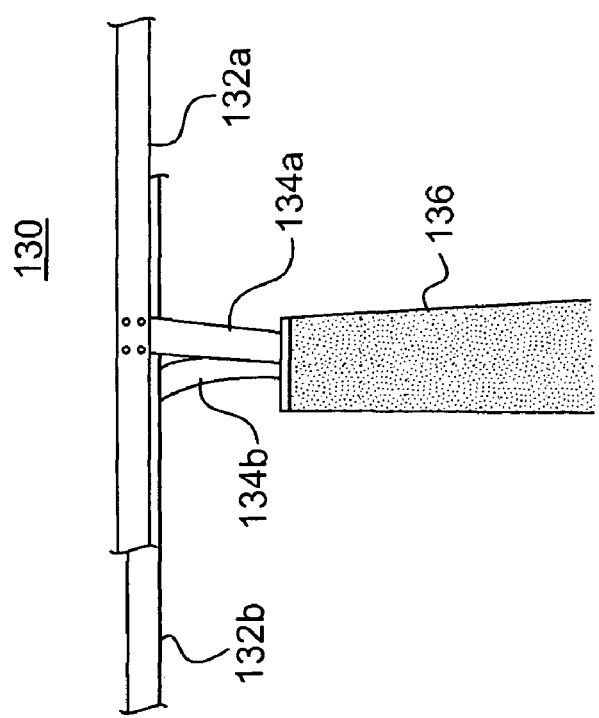

In exemplary transport system 100, guide rail structure 130 can be arranged to define a route of travel along a desired course at an elevated height for transport of passengers and/or cargo. With further reference to FIGS. 5A and 5B, guide rail structure 130 includes a pair of guide rails 132a, 132b, which are elevated and supported by a plurality of support posts 136. More particularly, a pair of support beams 134a, 134b is mounted on top of each support post 136, and the support beams extend oppositely from the support post and to respectively support guide rails 132a, 132b.

Guide rails 132a, 132b can be made of, for example, a hard and strong metal such as steel. Guide rails 132a, 132b may comprise, for example, a number of steel tubes that are welded end-to-end in a manner that accounts for thermal expansion and contraction. In this manner, guide rails 132a, 132b can be arranged as a substantially continuous dual rail guide track that provides a desired path of travel for vehicle 110. Guide rail structure 130 can provided with banked turns having curvatures that are not too abrupt and can be suitably handled by vehicle 110. Guide rails 132a, 132b may also be weather resistant so as to prevent collection of elements such as snow, rain, and ice on the active surfaces thereof.

Support posts 136 can positioned periodically along existing roadways and extend vertically from, for example, a cement barrier, to elevate and hold guide rails 132a, 132b well above existing highway traffic. Support posts 136 may be made of, for example, steel, reinforced concrete, and/or any other suitable structural materials. In exemplary embodiments, the spacing of support posts 136, as well the length of body 112, may be adjusted based on travel speed, load capacity, and other requirements. Additionally, the respective heights of support posts 136 may be varied in accordance with the topography of the land over which transport system 100 is installed to provide for a more level and smooth travel path of vehicle 100.

With further reference to FIGS. 6A-6D, undercarriage structure 140 of exemplary transport system 100 includes a deck 142 extending between a pair of opposing, longitudinally extending pontoons 144a, 144b. A plurality of shocks 146 are partially disposed within respective recesses 148 and project from a top surface 150 of each pontoon 144a, 144b into a space between body 112 and undercarriage structure 140. Shocks 146 may be spring-loaded within respective recesses 148 at varying heights and configured to recess evenly into undercarriage 140 under a sufficiently large force of gravity from a weight of vehicle 110 on the undercarriage. In alternative exemplary embodiments, any suitable shock absorbing mechanisms may be employed.

A respective pair of lifting gear keepers 180 also extends from the top surface of each pontoon 144a, 144b. The lifting gear keepers of each pontoon are respectively aligned with the front and rear legs of a corresponding side of vehicle body 110 and, as will be explained in greater detail below, configured to receive and contain the lifting gear roller 172 of the corresponding leg therein. Undercarriage structure 140 further includes a plurality of braces 152 each connected at one end to a corresponding one of pontoons 144a, 144b and connected at an opposing end to a corresponding one of lifting gear keepers 180 of the pontoon to provide support for the corresponding lifting gear keeper.

Figure 6B:
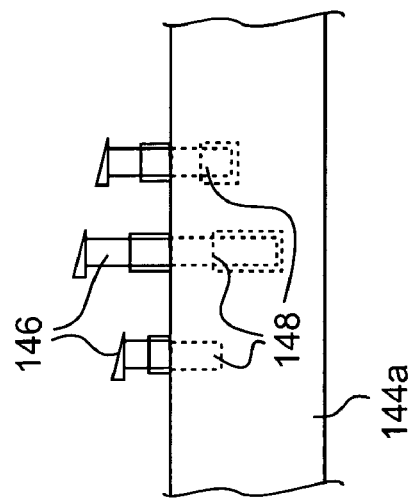
Figure 6A:
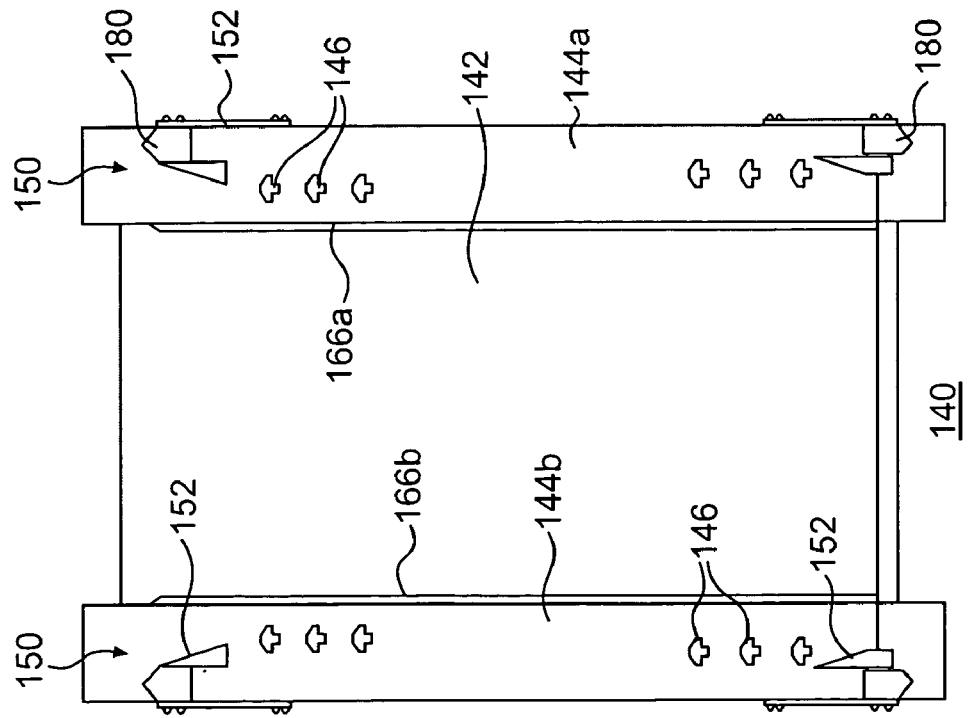

Pontoons 144a, 144b are configured to movably connect to and travel along guide rails 132a, 132b respectively via a plurality of running guide assemblies 154. As illustrated in FIG. 6A, each running guide assembly 154 of undercarriage structure 140 includes a pair of guiding wheel supports 156a, 156b and a pair of running gear rollers or wheels 158a, 158b respectively mounted on and extending from opposing inside surfaces 166a, 166b of pontoons 144a, 144b. Running guide assemblies 154 are configured such that guide wheel keepers 156a and running gear wheels 158a extending from pontoon 144a oppose corresponding guiding wheel supports 156b and running gear wheels 158b extending from pontoon 144b. Pontoons 144a, 144b are connected to respective guide rails 132a, 132b via running guide assemblies 154 with guiding wheel supports 156a, 156b respectively disposed beneath guide rails 132a, 132b and running gear wheels 158a, 158b respectively disposed above guide rails 132a, 132b. Guiding wheel supports 156a, 156b running gear wheels 158a, 158b may be made from, for example, a hard rubber material such as polyurethane.

For each running guide assembly 154, running gear wheels 158a, 158b of the opposing pontoons of undercarriage structure 140 are connected to one another via a rigid axle 160 on which both running gear wheels are configured to revolve in unison. Each axle 160 extends perpendicularly to pontoons 144a, 144b and is connected to deck 142 of undercarriage structure 140 via axle staffs 162 that extend from and are fixed in place on the axle by bearings 164. As will be explained in greater detail, running guide assemblies 154 are shiftingly engaged to guide rails 132a, 132b to thereby guide movement of vehicle 110 along the path of travel formed by guide rails by allowing running gear wheels 158a, 158b to roll on an upper surface of the guide rails until vehicle 110 reaches a sufficient speed, at which point side wings 114 provide an aerodynamic lifting force on the vehicle that overcomes the force of gravity (from the weight of the vehicle on guide rail structure 130) to thereby displace the running gear wheels from the guide wheels and enable high-speed, airborne flight of the vehicle guided along the guide rails by free-wheeling guiding wheel supports 156a, 156b. During such high-speed, airborne flight of vehicle 110, guiding wheel supports 156a, 156b prevent derailing of vehicle 110 and undercarriage structure 140 from guide rails 132a, 132b by traversing along a bottom surface of the guide rails.

Lifting gear mechanism 170 of exemplary transport system 100 comprises lifting gear rollers 172 of vehicle body 110 and lifting gear keepers 180 of undercarriage structure 130. As noted above, the lifting gear keepers extending from each pontoon 144a, 144b are respectively aligned with the front and rear legs of a corresponding side of vehicle body 110 and configured to receive and contain lifting gear roller 172 of the corresponding leg therein.

Figure 7B:
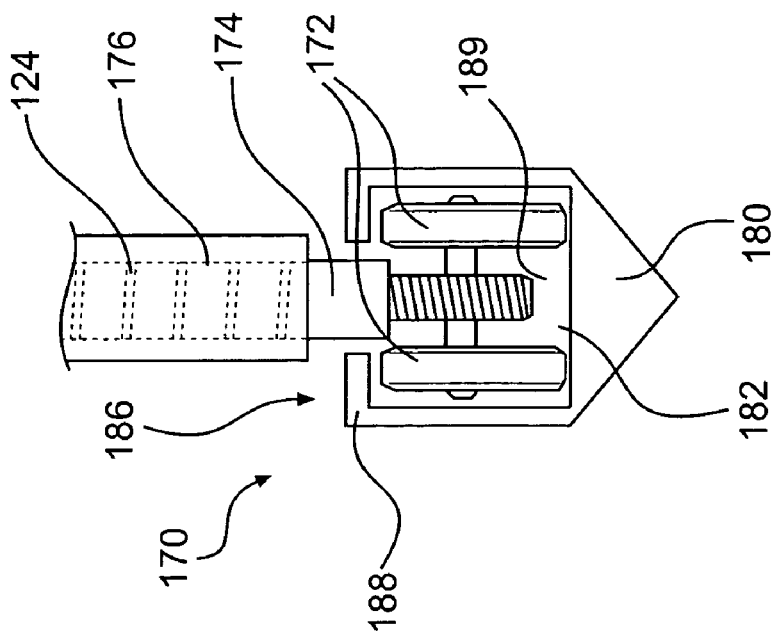
FIGS. 7A and 7B illustrate an exemplary lifting gear mechanism.
Figure 7A:
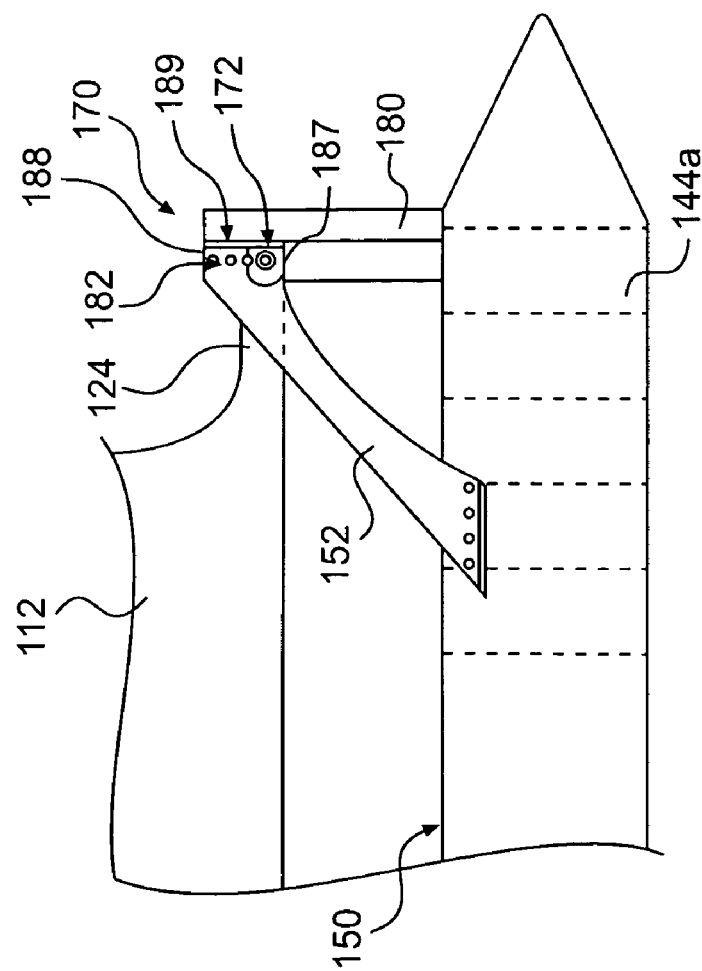

More particularly, as illustrated FIG. 7A, each lifting gear keeper 180 of undercarriage structure 140 is formed with a vertically-extending recess 182 at an upper section thereof. Recess 182 is shaped and configured to receive and contain lifting gear roller 172 that extends from the corresponding leg of vehicle body 110 therein. As illustrated in FIG. 7B, lifting gear roller 172 extends from end 128 of leg 124 via a shaft 174 that projects out from an internal sleeve 176 formed within the leg that is configured to receive one end of the shaft therein, and lifting gear keeper 180 is further formed with an opening to recess 182 in a receiving side 186 that is configured to receive the opposing end of the shaft therein. While the opening is formed sufficiently wide such that shaft 174 can pass therethrough, lifting gear keeper 180 is further formed with opposing flanges 188 on receiving side 186 that retain lifting gear roller 172, which is wider than the shaft, within recess 182.

As noted above, lifting gear mechanism 170 couples vehicle 110 to undercarriage structure 140, and the undercarriage is configured to enable the vehicle to travel along the path of guide rail structure 130 via running gear wheels 158a, 158b rolling on guide rails 132a, 132b until the vehicle reaches a sufficient speed, at which point side wings 114 provide an aerodynamic lifting force to thereby enable high-speed, airborne flight of the vehicle guided along the guide rails. This guided airborne traveling of vehicle 100 is facilitated by operation of lifting gear mechanism 170. In particular, as illustrated in FIG. 7A, each lifting gear keeper 180 is formed to permit the corresponding lifting gear roller to roll generally longitudinally away from and toward undercarriage 140 within recess 182. When vehicle 110 is at rest or traveling at low speeds (for example, less than 50 miles per hour), the weight of the vehicle is supported by undercarriage 140 via lifting gear keepers 180, with each lifting gear roller 172 being retained within recess 182 of the corresponding lifting gear keeper by a floor 187. As vehicle 110 accelerates to a point at which side wings 114 provide an aerodynamic lifting force on the vehicle, however, each lifting gear roller 172 will lift or roll up within recess 182 of the corresponding lifting gear keeper until reaching a point at which the lifting gear roller is retained within the recess against a ceiling 188. At this point, the weight of undercarriage 140 will comprise essentially all of the weight on guide rails 132a, 132b. When vehicle 110 returns to a lower speed after achieving airborne flight, each lifting gear roller 172 will drop or roll down within recess 182 of the corresponding lifting gear keeper until reaching a point at which the lifting gear roller is again retained within the recess against floor 187.

In exemplary embodiments, as illustrated in FIG. 7A, each lifting gear keeper 180 can be slightly inclined or sloped away from a center of the undercarriage with respect to the top surface of the corresponding pontoon to provide a smoother transition to airborne flight for the vehicle. In an alternative embodiment, each lifting gear keeper 180 may extend perpendicularly from the top surface of the corresponding pontoon and have a recess that is formed to slightly incline or slope away from a center of the undercarriage with the lifting gear keeper. Moreover, to further increase stability, shaft 174 of each lifting gear roller 172 can be spring loaded within sleeve 176 of the corresponding leg of vehicle 110 such that a tension spring operates to push the lifting gear roller forward as the lifting gear roller lifts up within recess 182 of the corresponding lifting gear, thereby resulting in the lifting gear roller rolling upward along an interior surface 189 of the recess as the vehicle becomes airborne.

Exemplary transport system can be provided with any suitable propulsion system that causes vehicle 110 to traverse and accelerate along guide rail structure 130. For example, as shown in FIGS. 1 and 2, vehicle 110 can be provided a pair of engines 122 disposed on opposing sides of body 112. Engines 122 may comprise, for example, a pair of high-bypass turbo fan engines, electric motor-driven ducted propellers, or any other suitable type of electric motor. In some embodiments, vehicle 110 can be further propelled along guide rail structure 130, at low speeds, by electric drive units driving running gear wheels 158. In other embodiments, running gear wheels 158 can be free-wheeling units.

Figure 8B:
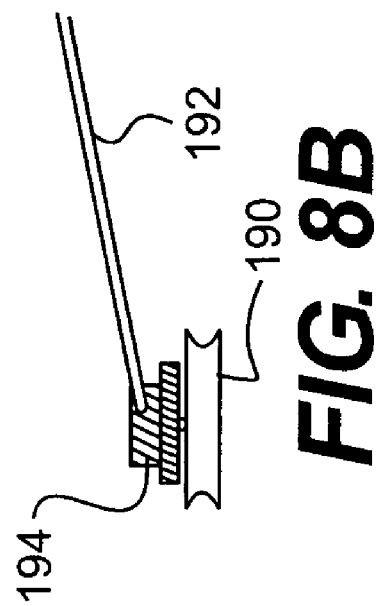
FIGS. 8A and 8B illustrate an exemplary power-pickup system.
Figure 8A:
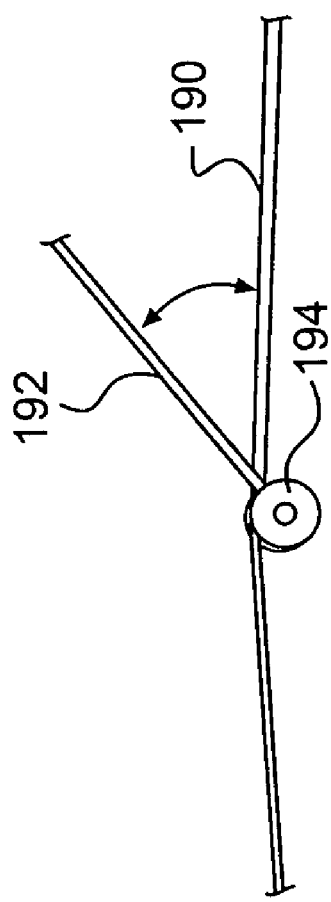

As illustrated in FIG. 5A, electrical power for engines 122, the drive units for running gear wheels 158, and other electrically operated devices may be provided by conductor wires 190 that are mounted to guide rail structure 130 to extend along a center of the path formed by guide rails 132a, 132b. Conductor wires 190 can provide a similar function to that of a conventional trolley wire, and, as illustrated in FIGS. 8A and 8B, a second conductor wire 192 leading from a suitable power source on the vehicle 110 can connect with conductor wires 190 via a wheel 194 to enable power pickup by the vehicle from the conductor wires 190. The conductor 108 is engaged by a spring loaded electrical contact 112 carried on the aircraft 10 and insulated by a suitable insulator 114. Suitable wiring (not shown) extends from the contact 112 to the drive units 106 and other electrically operated devices within the aircraft. As shown in FIG. 8A, conductor wire 192 can extend in various directions from an axis of wheel 194 to accommodate both airborne and rolling travel of the aircraft while maintaining electrical contact with conductor wires 190. Such a system can implemented to provide for continuous supply of electric power from guide rail structure 130 to vehicle 110 and eliminate a need for time-consuming fuel stops.

Of course, it should be understood that, in alternative exemplary embodiments, transport system 100 may employ any other suitable power supply systems for vehicle 110, such as, for example, magnetic propulsion, gasoline-powered or hybrid gasoline/electric-powered engines, banks of storage batteries, and onboard power generation for developing thrust such as jet-propelled or propeller driven motive force generators. Transport system 100 may further be implemented to employ multiple types of power supply systems for powering different functions of vehicle 110. For example, propulsion of vehicle 110 may be powered by electricity picked up from guide rail structure 130 as described above, while a diesel or other power driven generator can be mounted within the vehicle to supply electrical power for onboard vehicle services such as lighting, heating, air conditioning, galley services, ventilation, and the like. The generator can be supplied with energy from a suitable source, such as fuel from an on-board fuel tank.

In operation, exemplary transport system 100 may be used to transport passengers and/or cargo between stations or terminals located along guide rail structure 130. After the passengers and/or cargo have been loaded into vehicle 110, the propulsion system can be activated to propel the vehicle along guide rail structure 130 in a low-speed mode of operation in which running gear wheels 158 roll in a forward along the upper surfaces of guide rails 132a, 132b. As vehicle 110 is accelerated along guide rail structure 130 to approach flying speed, the aerodynamic capabilities of the vehicle will then provide sufficient lift to lift the vehicle such that lifting gear rollers 172 lift or roll up within recesses 182 of corresponding lifting gear keepers 180 until reaching a point at which the lifting gear rollers are retained within the recesses by ceilings 188.

At this point, a high-sped mode of operation is achieved at which running gear wheels 158 will be displaced from guide rails 132a, 132b as a result of the lifting force of the vehicle acting on undercarriage structure 140 via lifting gear assembly 170 so that undue friction between the running gear wheels and the guide rails can be avoided. During this high-speed mode of operation, the weight of undercarriage 140 will comprise essentially all of the weight on guide rails 132a, 132b, and guiding wheel supports 156a, 156b operate in conjunction with the lower surfaces of the guide rails to maintain vehicle 110 in the appropriate position along the path formed by guide rail structure 130. In exemplary embodiments, the profiles of wings 114, 116 can be configured according to a desired lift of vehicle 110 to minimize friction between guiding wheel supports 156a, 156b and guide rails 132a, 132b. Moreover, transport system 100 can be implemented to allow for the speed of vehicle 110 to be manually or automatically adjusted such that and to maintain a desirable offset between the force and gravity from the weight of the vehicle and the lifting force obtained.

Prior to the approach of vehicle 110 to another station or terminal, the speed is reduced to less than that necessary to maintain airborne flight, and lifting gear rollers 172 will drop or roll down within recesses 182 of corresponding lifting gear keepers 180 until reaching a point at which the lifting gear rollers are again held within recesses at floors 187. Vehicle 110 can thereafter be propelled in the low speed mode to the station or terminal, at which point the vehicle is stopped for unloading and/or loading of passengers and/or cargo. Running gear wheels 158 remain in a position to come into contact with guide rails 132a, 132b whenever vehicle 110 loses flying speed and, as illustrated in FIG. 6A, can be mounted to pontoons 144a, 144b via flanges 168 that operate to aid in centering undercarriage 140 on guide rail structure 130 in the low speed mode of operation. Vehicle 110 and/or other aspects of transport system 100 may be implemented with any suitable braking mechanisms for slowing or stopping the progress of the vehicle along guide rail structure 130.

As described above with reference to FIGS. 6A-6D, undercarriage structure 140 of exemplary transport system 100 can include a plurality of shocks 146 are partially disposed within respective recesses 148 and extend from top surface 150 of each pontoon 144a, 144b. Shocks 146 can operate to dampen shock forces acting on vehicle 110 when the vehicle loses flying speed or when bumpy weather is encountered in the high-speed mode of operation. Shocks 146 may be spring-loaded within respective recesses 148 at varying heights and configured to recess evenly into undercarriage 140 under a sufficiently large force of gravity from a weight of vehicle 110 on the undercarriage to provide stability and shock absorbing capability.

In exemplary embodiments, transport system 100 can be implemented such that the path of travel formed by guide rail structure 130 follows along already existing major interstate highway systems. As discussed above, support posts 136 would be positioned periodically along the existing highway systems to elevate and hold guide rails 132a, 132b well above existing highway traffic. In this manner, the cost of providing right-of-ways for implementing transport system 100 can be absorbed by adapting the transport system to the already existing right-of-ways along the highway system. Thus, installation cost can be kept low because right-of-way cost has already been expensed and the guide rail structure can primarily be made from low construction-cost materials. Furthermore, maintenance costs can also be kept low because airborne, low-friction travel at high speeds can substantially reduce wear and tear of both the vehicle and the guide rail structure by minimizing physical contact therebetween.

In exemplary embodiments, transport system 100 can be implemented such that stations or terminals located along guide rail structure 130 are provided with control stations through which operation of vehicles traveling along the guide rail structure can be monitored and controlled. For example, a control station at a terminal can be implemented to utilize a power grid system to determine and control whether a vehicle will stop at the terminal or continue traveling through the terminal without stopping, for example, in a situation where no local traffic is present to be serviced. In exemplary embodiments, such stations or terminals may also be provided with crossover tracks to allow for a control station to provide for interchanging of vehicle routes along various travel paths formed by different guide rail structures intersecting at the terminal. In exemplary embodiments, such stations or terminals can be elevated above existing roadways.

Additionally, in exemplary embodiments, transport system 100 may be implemented with guide rail structures allowing two different vehicles to travel on different tracks in opposite directions. In embodiments implemented with such a two track system, the guide rails can be located side by side (in which case, stations or terminals located that are located along the two-track guide rail structure can be provided on both sides of the guide rail structure) or one above the other and supported by an appropriately adapted guide rail structure in a manner similar to what has been shown and described herein.

While the invention has been described with reference to exemplary embodiments, it should be understood that various changes, substitutions, and alternations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A transportation system, comprising:
  a vehicle body having a set of wings extending outward therefrom, the set of wings being adapted to generate aerodynamic lift on the vehicle body when a traveling speed of the vehicle body exceeds a first speed;
  a propulsion system configured to propel to vehicle body to accelerate the traveling speed of the vehicle body from less than the first speed to a second speed that exceeds the first speed;
  an elongated guide rail structure forming a path of travel;
  an undercarriage disposed beneath the vehicle body;
  a lifting gear mechanism coupling the vehicle body to the undercarriage, the lifting gear mechanism being configured to support a load of the vehicle body in a first position in relation to the undercarriage when the traveling speed of the vehicle body is less than the first speed, to allow the vehicle body to lift from the first position to a second position in relation to the undercarriage as the traveling speed of the vehicle body accelerates from less than the first speed to the second speed, and to maintain the vehicle body in the second position when the traveling speed of the vehicle body is greater than or equal to the second speed; and
  a guidance assembly movably connecting the undercarriage to the guide rail structure, the guidance assembly comprising a set of rollers and a set of guiding supports configured to shiftingly engage the guide rail structure such that the set of rollers are in rolling contact with the guide rail structure to guide movement of the undercarriage along the path of travel when the vehicle body is traveling in the first position in relation to the undercarriage, the set or rollers are displaced from the guide rail structure when the vehicle body is traveling in the second position in relation to the undercarriage, and the guiding supports guide movement of the undercarriage along the path of travel when the vehicle body is traveling in the second position in relation to the undercarriage.

2. The transportation system according to claim 1, wherein the guide rail structure comprises an elevated pair of guide rails forming a dual rail guide track that provides the path of travel.

3. The transportation system according to claim 2, wherein the guide rail structure further comprises a plurality of support posts positioned periodically along the path of travel and extending vertically from a ground surface to elevate and support the pair of guide rails, and wherein a pair of support beams are mounted on and extend oppositely from a top surface of each support post to respectively support the pair of guide rails.

4. The transportation system according to claim 3, wherein the path travel is adjacent to already existing roadways, and wherein the plurality of support posts extend vertically from a ground surface to a height that is sufficient to elevate and support the pair of guide rails above vehicle traffic along the roadways.

5. The transportation system according to claim 2, wherein the undercarriage comprises a deck extending between a pair of opposing, longitudinally extending pontoons, and wherein the guidance assembly is mounted on opposing, respective inside surfaces of the opposing pontoons and movably connects each pontoon of the pair of pontoons to a respective guide rail of the pair of guide rails beneath the deck.

6. The transportation system according to claim 5, wherein the vehicle body further comprises a set of legs extending from a base thereof, wherein the lifting gear mechanism comprises a plurality of lifting gear rollers respectively extending from the plurality of legs and a plurality of lifting gear keepers extending from top surfaces of the pontoons, wherein each lifting gear roller of the plurality of gear rollers is received within a longitudinally-extending recess formed within a respective lifting gear keeper of the plurality of lifting gear keepers that permits longitudinal movement of the lifting gear roller within the recess between an internal floor and an internal ceiling, and wherein the lifting gear mechanism is configured such that the lifting gear rollers rest on the internal floors of the respective lifting gear keepers when the traveling speed of the vehicle body is less than the second speed, the lifting gear rollers lift from the internal floors to contact the internal ceilings when the vehicle lifts to the second position in relation to the undercarriage as the traveling speed of the vehicle body accelerates from less than the first speed to the second speed, and the internal ceilings retain the lifting gear rollers within the recesses of the respective lifting gear keepers when the traveling speed of the vehicle body is greater than or equal to the second speed.

7. The transportation system according to claim 6, wherein each lifting gear keeper extends at a slight incline to an orthogonal direction to the top surfaces of the pontoons, and wherein each lifting gear roller is spring-loaded within the respective leg of the plurality of legs, thereby allow each lifting gear roller to roll up within the recess along an internal wall of the respective lifting gear keeper when the lifting gear roller lifts from the internal floor to contact the internal ceiling of the respective lifting gear keeper.

8. The transportation system according to claim 5, wherein the guidance assembly is mounted on the respective inside surface of each of the opposing pontoons such that rollers of the set of rollers are mounted on the inside surface adjacent to a top surface of the respective guide rail and guiding supports of the set of guiding supports are mounted on the inside surface adjacent to a bottom surface of the respective guide rail.

9. The transportation system according to claim 5, further comprising a plurality of shocks each partially disposed within a respective recess formed the pontoons, the plurality of shocks projecting from top surfaces of the pontoons to varying heights and being spring-loaded within the respective recesses so as to recess evenly into the pontoons when the load of the vehicle body is sufficiently high.

10. The transportation system according to claim 1, wherein the set of wings includes a pair of side wings laterally projecting from opposing sides of vehicle body proximate to a front end of the vehicle body, a pair of tail wings laterally projecting from opposing sides of the vehicle body proximate to a rear end of the vehicle body, and a stabilizer projecting vertically from the rear end of the vehicle body.

11. The transportation system according to claim 1, wherein the set of wings are configured according to a desired offset between a force of gravity on the vehicle body and amount of lift force on the vehicle body that minimizes friction between the guiding supports and the guide rail structure when the traveling speed of the vehicle body is greater than or equal to the second speed.

12. The transportation system according to claim 1, wherein the propulsion system comprises a pair of engines disposed on opposing sides of the vehicle body proximate to a rear end of the vehicle body.

13. The transportation system according to claim 12, wherein the engines comprise electric motor-driven ducted propeller engines.

14. The transportation system according to claim 12, wherein the engines are selected from electric motor driven engines, high-bypass turbo fan engines, internal combustion engines, and hybrid gasoline and electric powered engines.

15. The transportation system according to claim 14, wherein the engines are electric motor driven engines, and wherein the electric motor driven engines are powered by electricity picked up along the path of travel by the vehicle body through electrical contact with conductor wires disposed along the guide rail structure.

16. The transportation system according to claim 1, wherein the second speed is at least 140 miles per hour.

* * * * *